United States Patent [19]
Hankins

[11] Patent Number: 5,816,349
[45] Date of Patent: Oct. 6, 1998

[54] DETACHABLE CYCLE UTILITY CARRIAGE

[76] Inventor: James E. Hankins, 1521 Hope St., Memphis, Tenn. 38111

[21] Appl. No.: 546,354

[22] Filed: Oct. 20, 1995

[51] Int. Cl.[6] .............................. B62D 59/04; B62M 7/14
[52] U.S. Cl. .......................... 180/11; 180/14.2; 280/204; 280/493
[58] Field of Search ............................... 180/11, 12, 14.2, 180/15, 16, 205, 209, 206; 280/204, 492–494

[56] References Cited

U.S. PATENT DOCUMENTS

| | | | |
|---|---|---|---|
| 1,165,467 | 12/1915 | Tideman | 180/11 |
| 1,341,379 | 5/1920 | Mauclaire et al. | 180/11 |
| 2,517,162 | 8/1950 | Arman | 280/204 |
| 3,734,536 | 5/1973 | Dever et al. | 280/204 |
| 3,877,723 | 4/1975 | Fahey et al. | 280/204 |
| 3,993,321 | 11/1976 | Cote | 280/204 |
| 4,200,164 | 4/1980 | Pearne | 180/208 |
| 4,346,772 | 8/1982 | Clifft | 180/11 |
| 4,371,184 | 2/1983 | Henden et al. | 280/204 |
| 4,413,835 | 11/1983 | Hazelett | 280/204 |
| 4,461,365 | 7/1984 | Diggs | 280/204 |
| 5,344,171 | 9/1994 | Garforth-Bles | 280/415.1 |
| 5,423,393 | 6/1995 | Felt | 180/22 |

FOREIGN PATENT DOCUMENTS 0872349  6/1942  France ..................................... 180/11

*Primary Examiner*—Anne Marie Boehler

[57] ABSTRACT

A trailer motor carriage configuration that is easily detachable from a bicycle or multi-wheel vehicle. A maneuvering mechanism attaches the carriage to the rear of the vehicle. The mechanism prevents interference of the carriage with the vehicle while maneuvering around corners and on uneven surfaces. The configuration is constructed to support a heavy payload under adverse conditions. It has an axle and two wheels rotatably mounted thereon. A motor mounted on the carriage produces rotational energy, and a clutch and throttle transmit rotational energy to the wheels. So equipped, either the vehicle or carriage can propel the other.

2 Claims, 4 Drawing Sheets

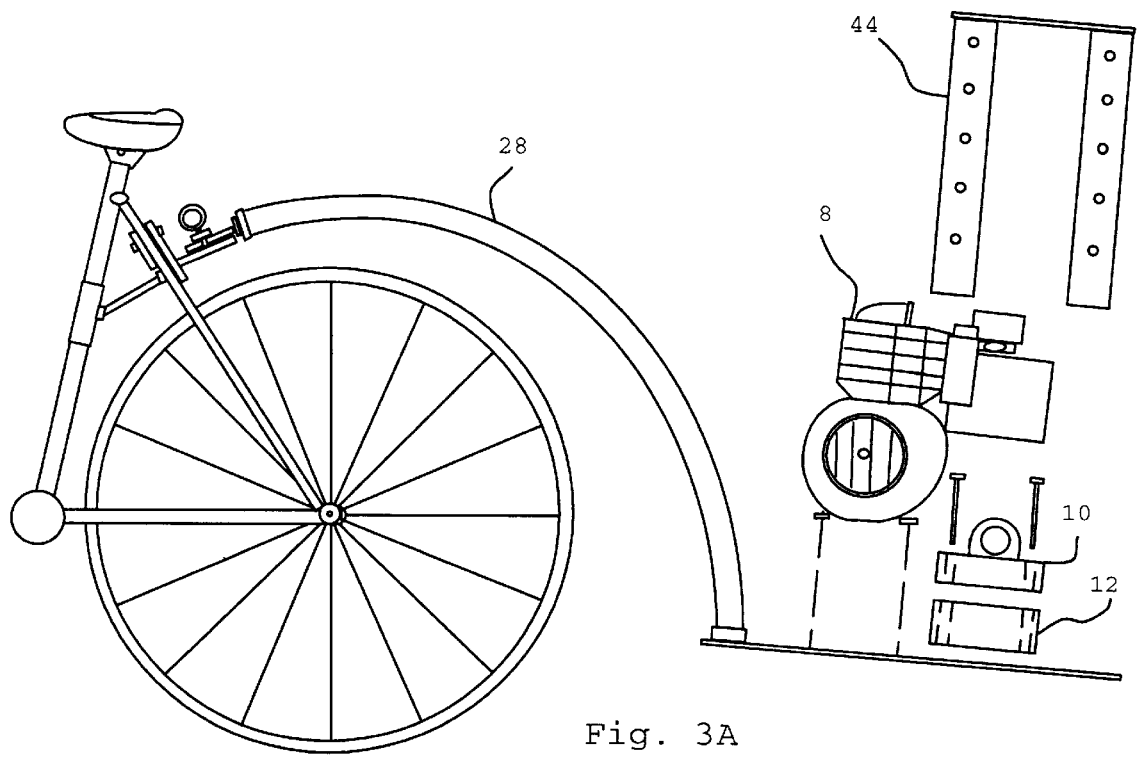
Fig. 3A
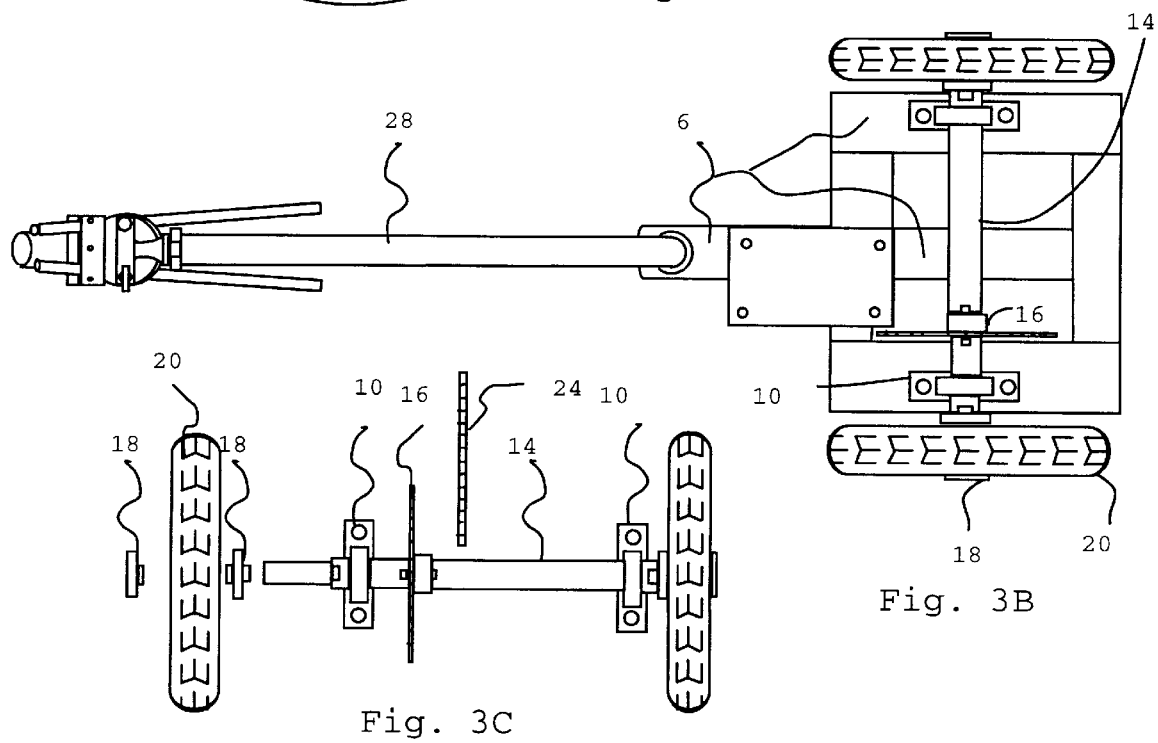
Fig. 3B
Fig. 3C

DETACHABLE CYCLE UTILITY CARRIAGE

BACKGROUND—FIELD OF INVENTION

This invention relates to an apparatus which powers another vehicle, specifically to power a bicycle.

BACKGROUND—DESCRIPTION OF PRIOR ART

In the past there have been motors attached to bicycles in numerous styles. Some have had dangerous to operate control levers while riding. The motors, control levers, drive assembly, and mounting brackets took up much cargo space. Control system for Moped motor U.S. Pat. No. 4,200,164 to Pearne Jun. 19, 1978 shows such a design. Maneuverability is interfered with when you take your hand off the handlebars. Modification of the bicycle and buying special parts is extra expense. Awkward design and weight of some heavier models make modifications necessary.

OBJECTS AND ADVANTAGES

Accordingly, several objects and advantages of my invention are letting a cycle operate as normal, with a detachable cycle utility carriage attached or not. A detachable cycle utility carriage axially gives the cycle a bridge-type advantage in maneuverability. A detachable cycle utility carriage takes little space to attach, and requires no altering of the cycle. A detachable cycle utility carriage adds a whole new field of payload opportunities. Building a detachable cycle utility carriage can be done with minimal job-shop equipment reducing cost. Further objects and advantages of my invention will become apparent from a consideration of the drawings and ensuing decription.

DRAWING FIGURES

FIG. 1 is a side view of a detachable cycle utility carriage attached to a bicycle.

FIGS. 2-A and 2-B show a top view and a side view demonstrating the substant4ially vertical pivot axis.

FIG. 3-A is a side view showing how parts of the drive train are arranged.

FIG. 3-B is a top view of the drive train.

FIG. 3-C is a top view of the axle assembly.

FIGS. 4-A and 4-B illustrate the detachable latch and maneuvering mechanism.

| Reference Numerals in Drawings | | |
|---|---|---|
| 6 main base | 22 centrifugal | 38 hitch support plate |
| 8 motor | 24 roller chain | 40 bolt |
| 10 axle bearing | 26 connecting sleeve | 42 support arm |
| 12 spacer | 28 connecting arm | 44 support frame |
| 14 axle | 30 swivel hitch assembly | 46 control cable |
| 16 sprocket | 32 hitch plate assembly | 48 hand control |
| 18 hub | 34 I-bolt | 50 latch plate |
| 20 wheel | 36 wedge | |

DETAILED DESCRIPTION OF THE DRAWINGS

Figure 2A:
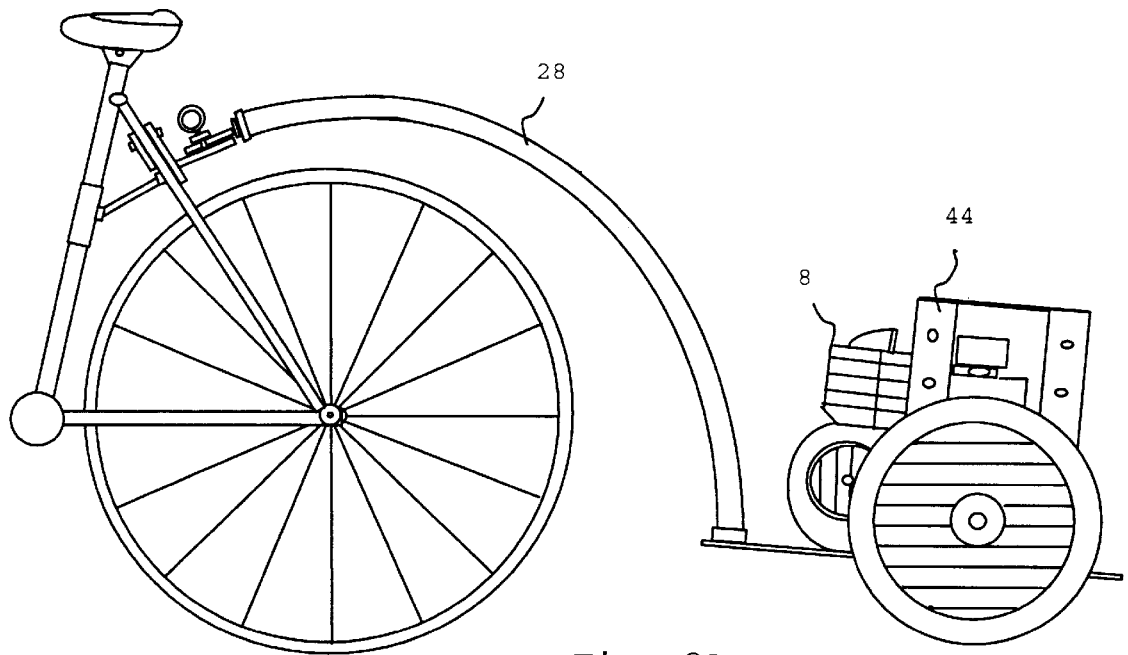
Figure 2B:
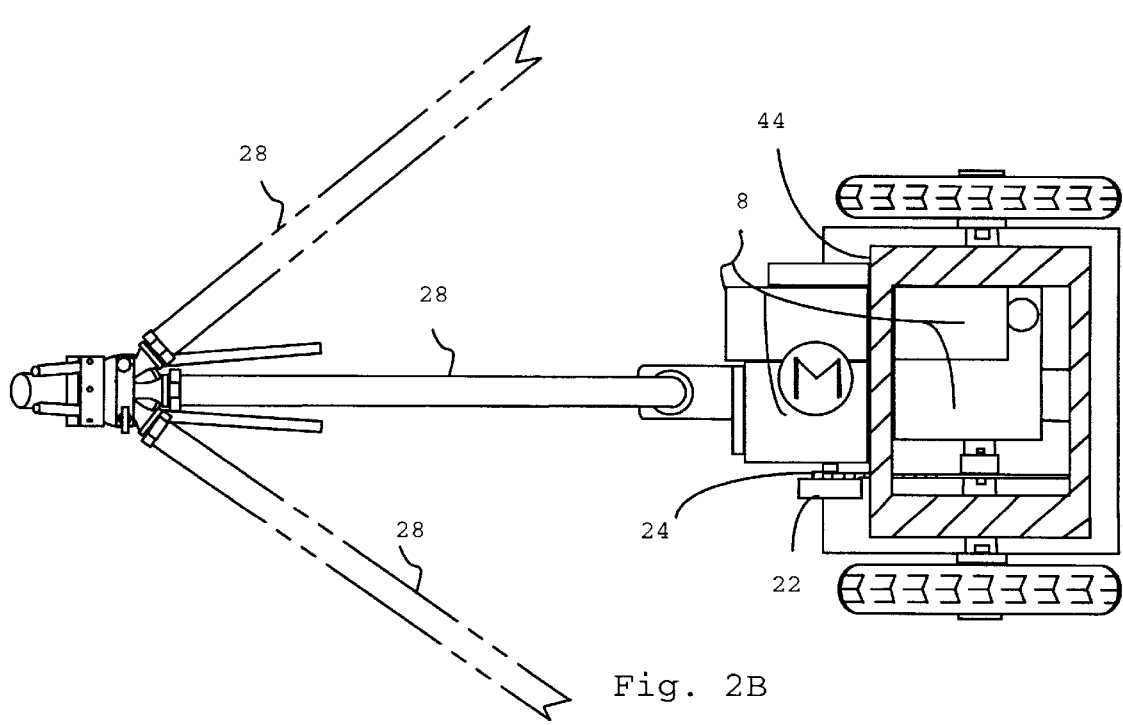

FIGS. 2-A and 2-B show the location of drive components and support frame 44.

FIG. 3 shows a over-all view of the components and their arrangement. A main base 6 comprises several strips of metal. Those strips are assembled together to make a flat base. Located at a point to distribute weight evenly a motor 8 is mounted. On each side are holes to mount each axle bearing 10. A spacer 12 is mounted underneath each axle bearing 10 to lower the center of gravity. An axle 14 is machined with a keyway to install hubs 18 and sprocket 16. A centrifugal clutch 22 is mounted on the motor shaft. A roller chain 24 connects centrifugal clutch 22 to a sprocket 16. Mounted to the front of main frame 6 is a connecting sleeve 26. A connecting arm 28 is made of strong flexible material, and is reinforced by connecting sleeve 26. The connecting arm 28 thus acts as a spring to follow contours in the traveling surface.

Figure 4A:
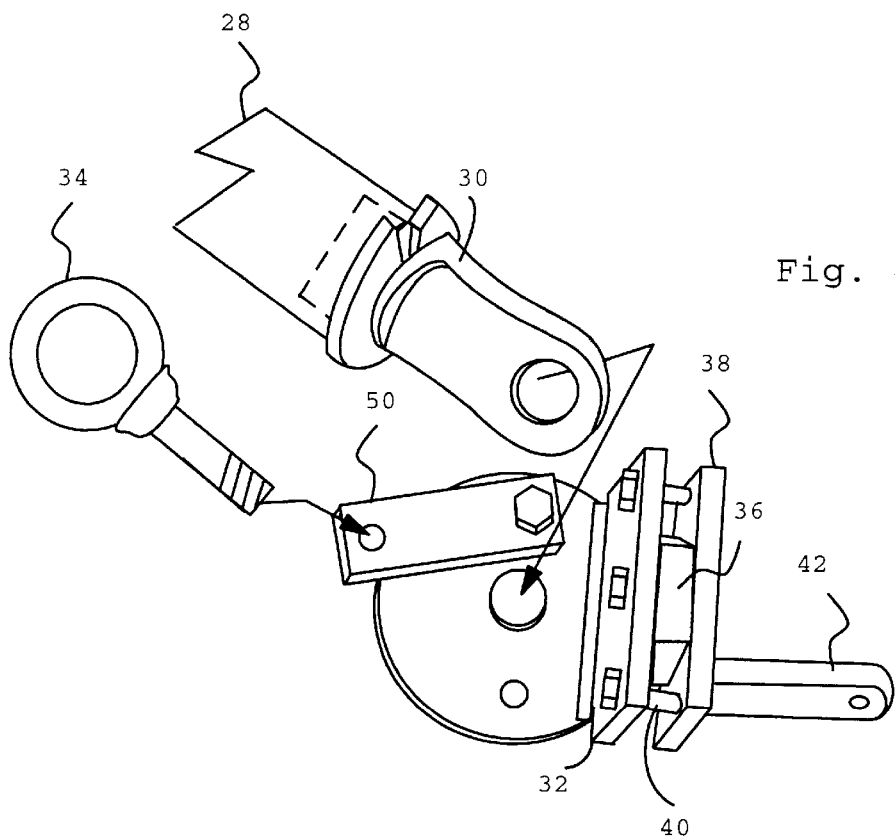
Figure 4B:
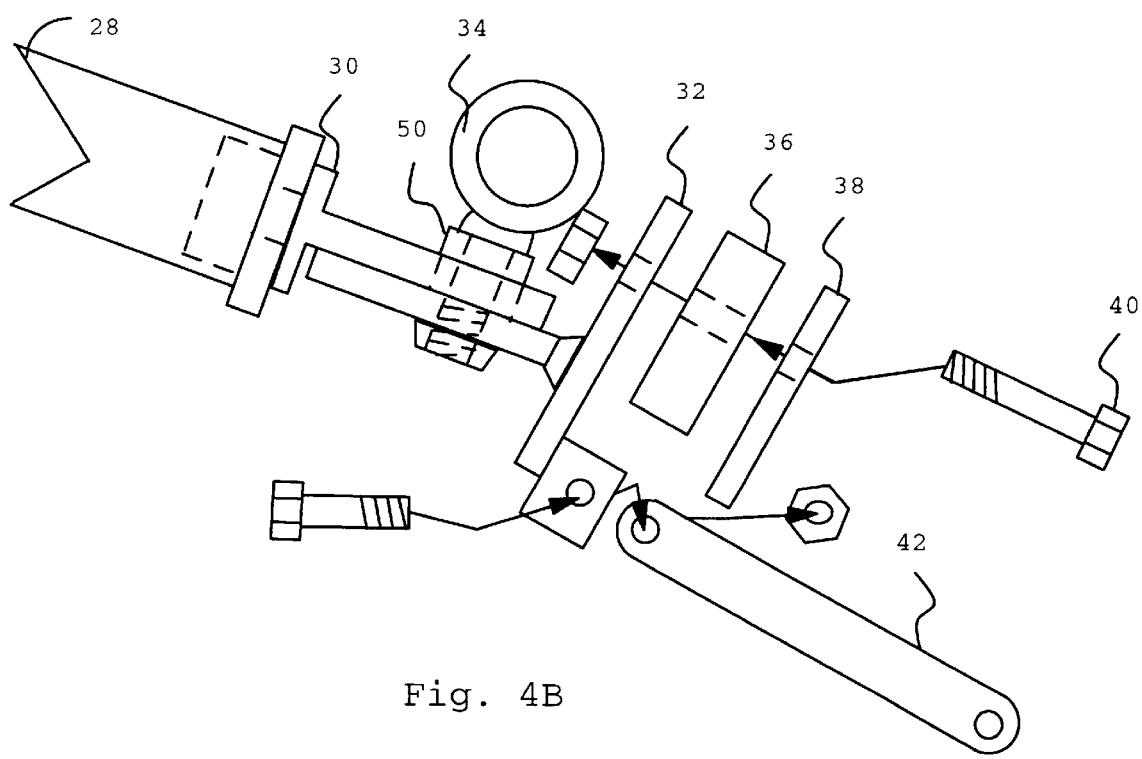

FIGS. 4-A and 4-B show the upper end components which make up the maneuvering mechanism. A swivel hitch assembly 30 is assembled and welded in place. The swivel hitch assembly turns 360° about a horizontal axis and has a hole for connecting to a hitch pin. A hitch plate assembly 32 is a flat disk with the hitch pin in the middle. Beside it a latch pin holds a latch plate 50. A mounting plate and tab are welded onto the flat disk. The hitch plate assembly 32 is to let the connecting arm 28 move from side to side about a substantially vertical axis. It also prevents a connecting arm 28 from accidental disconnection.

Note latch plate 50 will not clear the lip on top of swivel hitch assembly 30 in motion. It also prevents the connecting arm 28 from making contact with the bicycle. An I-bolt 34 is used to secure latch plate 50 for normal operation.

A wedge 36 is shaped to stay in place between the bicycle rear support struts. Behind this is the hitch plate assembly 32. In front is a hitch support plate 38. A bolt 40 is inserted through the center to join the three pieces. Two more bolts 40 are used to secure the latch plate 50 from moving. A support arm 42 is attached underneath to the hitch plate assembly 32. A repair clamp is used to hold the other end onto the bicycle.

Figure 1:
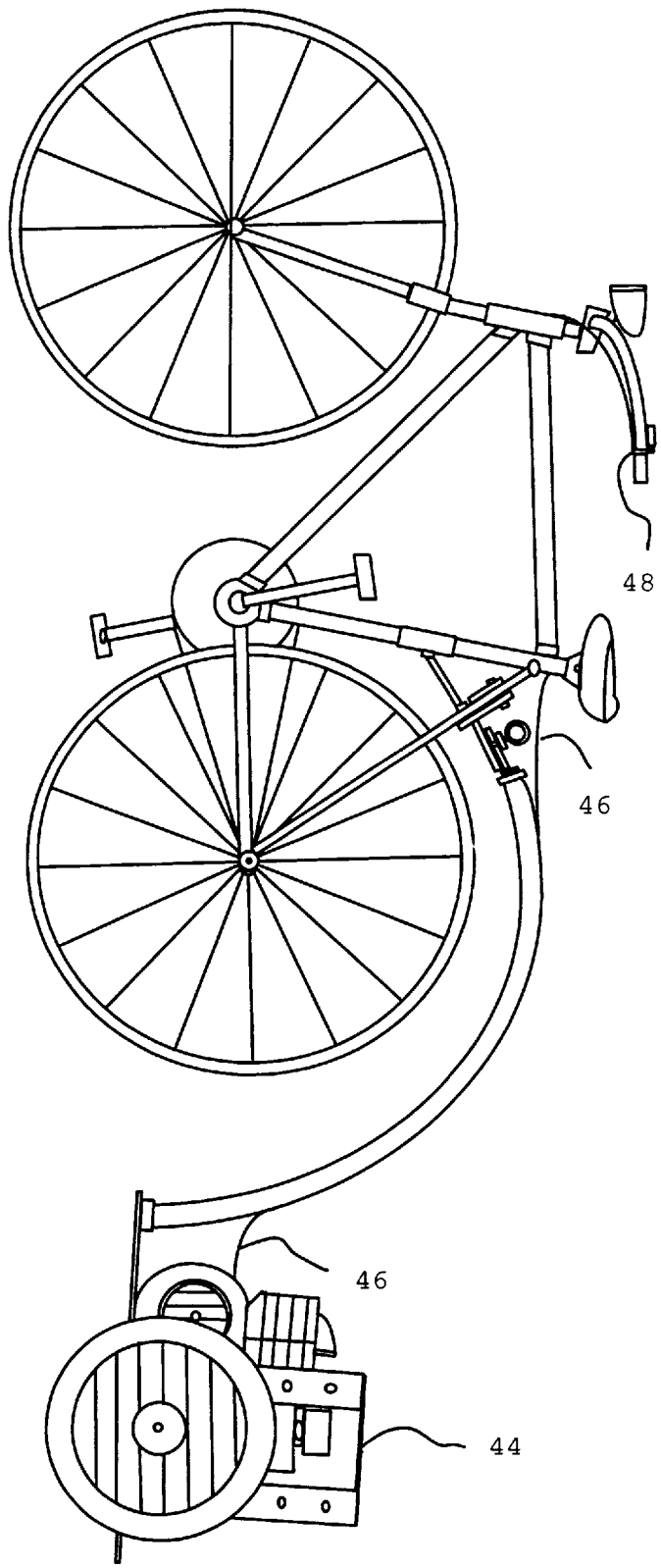

Operation—FIGS. 1 and 2

As shown in FIG. 1 the carriage is pulled behind a bicycle. It also has the ability to act as a moped. A control cable 46 and hand control 48 control speed.

With only a hitch plate assembly 32 and mounting hardware attached, a bicycle will function as it normally would without the carriage.

To attach detachable cycle utility carriage turn at a 90 degree angle to the bicycle. Slide swivel hitch assembly 30 onto hitch pin then turn latch plate 50 parallel, covering hitch pin and clearing lip on swivel hitch assembly 30. Then return bicycle to its original position. Attach threaded I-bolt 34 through latch plate 50 into hole and tighten. Install hand control 48 on handle bars and secure control cable 46.

Start motor 8 and accelerate to desired speed and decelerate when stopping. To disconnect carriage reverse order of assembly until swivel hitch assembly 30 is removed.

FIG. 2 shows the limit of turning obtainable with the connecting arm 28 which prevents jackknifing.

Summary, Ramifications, and Scope

As the reader can see the detachable cycle utility carriage is a practical, highly reliable, light-weight, yet economical sport and conversion vehicle. Useful to a wide variety of people, for a lot of different reasons.

While the above description contains many specifics, these should not be construed as limitations on the scope of the invention, but rather as an exemplifications of one preferred embodiment thereof. Many other variations are possible. For example, in a working or construction environment one might need to push a cart. A cart could be steered by mechanical means, and stopped when it reached its destination.

I claim:

1. A self propelled carriage for detachable connection to a lead vehicle comprising:

two wheels for supporting a heavy payload, and having a main base mounted between the wheels, a towing arm of strong, flexible material extending toward a front end of the carriage from the main base and centered between the two wheels, a swivel hitch assembly located at the front end of said towing arm and having a substantially longitudinal pivot axis which allows the vehicle to lean from side to side relative to the carriage, said swivel hitch assembly having a hole, a hitch plate assembly at the front end of the swivel hitch assembly, adapted to removably mount to the lead vehicle, the hitch plate assembly including a round flat base that angles downwardly toward the front end of the carriage, a hitch pin mounted in the middle of the flat base and engaging the hole of the swivel hitch assembly, such that the swivel hitch assembly moves through a range of motion about a substantially vertical pivot axis defined by the hitch pin, a latch means with a latch plate holds the swivel hitch assembly on the hitch plate assembly and limits the pivotal movement about the substantially vertical axis to prevent adverse contact to the towing arm against the lead vehicle, also having said swivel hitch assembly limited in its range of motion about said substantially vertical pivot axis by a latch pin on one side of the round flat base and an eye bolt on the opposite side of said round flat base preventing excess travel of the towing arm, an engine mounted on the main base for producing rotational energy, and means for controllably coupling rotational energy form said engine to said two wheels, so as to propel said carriage and lead vehicle along a surface.

2. A self propelled detachable carriage as claimed in claim 1, including means for detaching the swivel hitch assembly from the hitch plate including said removable eye bolt which holds the hitch plate in position on the base, wherein only when the eye bolt is removed and the lead vehicle is turned 90 degrees will the latch plate swing clear to release the swivel hitch assembly, in operation the latch plate cannot clear a lip of the swivel hitch assembly so the latch plate will not allow the detachable carriage to uncouple from the hitch pin in a riding position behind the lead vehicle.

* * * * *